United States Patent [19]

Peyret

[11] Patent Number: 5,511,125
[45] Date of Patent: Apr. 23, 1996

[54] METHOD AND DEVICE FOR THE UTILIZATION OF ELECTRICAL SIGNALS

[75] Inventor: Patrice Peyret, Fuveau, France

[73] Assignee: Gemplus Card International, Gemenos, France

[21] Appl. No.: 233,644

[22] Filed: Apr. 26, 1994

[30] Foreign Application Priority Data

Apr. 28, 1993 [FR] France .................................. 93 05022

[51] Int. Cl.⁶ .............................. H04L 9/00; H04N 7/167
[52] U.S. Cl. .................................. 380/49; 380/9; 380/10; 380/59
[58] Field of Search .................................. 380/2, 6, 7, 9, 380/10, 16, 19, 23, 49, 59, 20

[56] References Cited

U.S. PATENT DOCUMENTS

| | | | |
|---|---|---|---|
| 4,058,830 | 11/1977 | Guinet et al. .............................. 380/16 |
| 4,688,247 | 8/1987 | Davidov .................................... 380/19 |
| 4,719,624 | 1/1988 | Bellisio .................................. 380/9 X |
| 4,727,579 | 2/1988 | Wright et al. ............................. 380/20 |
| 4,797,919 | 1/1989 | Murray et al. ......................... 380/10 X |
| 4,807,286 | 2/1989 | Wiedemer ................................. 380/16 |
| 4,905,280 | 2/1990 | Wiedemer ................................. 380/16 |
| 4,907,273 | 3/1990 | Wiedemer ................................. 380/16 |
| 4,908,834 | 3/1990 | Wiedemer ............................... 380/7 X |
| 4,993,066 | 2/1991 | Jenkins .................................... 380/16 |
| 5,144,663 | 9/1992 | Kudelski et al. ......................... 380/16 |
| 5,237,610 | 8/1993 | Gammie et al. ......................... 380/10 |

FOREIGN PATENT DOCUMENTS

| | | | |
|---|---|---|---|
| WO85/00718 | 2/1985 | WIPO .............................. H04N 7/16 |
| WO86/01962 | 3/1986 | WIPO .............................. H04N 7/16 |

OTHER PUBLICATIONS

BBC Research Department Report No. 10, Aug. 1988; Tadworth, Surrey, Gr. Britain; pp. 1–18; D. T. Wright, *Conditional Access Broadcasting: Datacare 2.*

*Primary Examiner*—Bernarr E. Gregory
*Attorney, Agent, or Firm*—Nilles & Nilles

[57] ABSTRACT

An interface is made for a device for the exploitation of electrical signals between a receiver of this device and a device for the exploitation of these signals. The interface is capable of sending, alternatively, signals received by the receiver to an external circuit and signals delivered by the external circuit to the exploitation circuit. It is shown that this approach can be used to resolve problems of the scrambling and unscrambling of audio-visual signals.

8 Claims, 3 Drawing Sheets

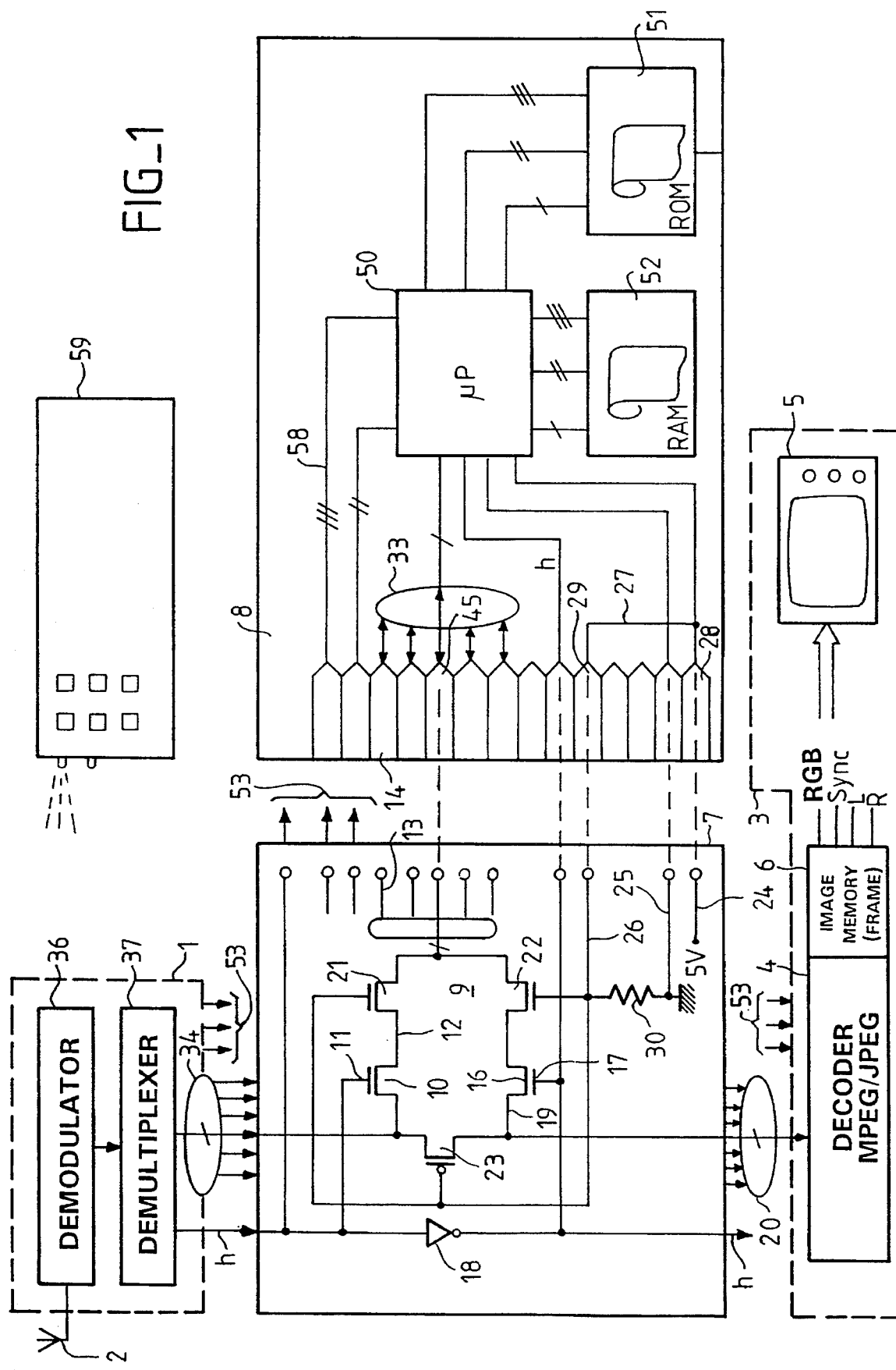

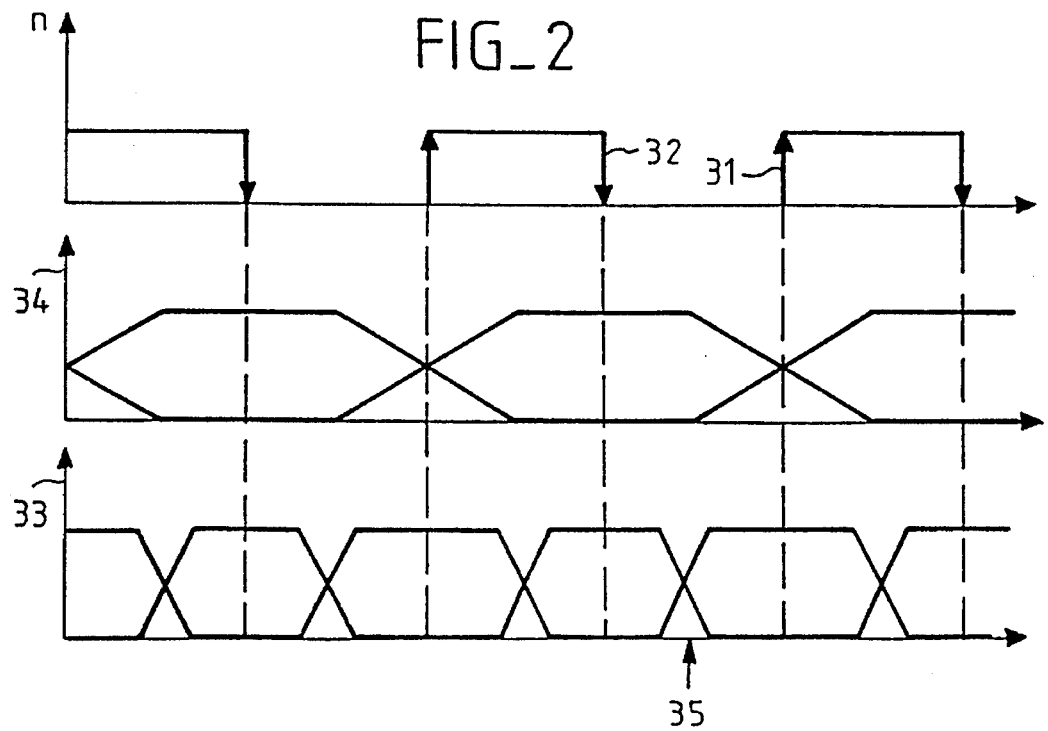
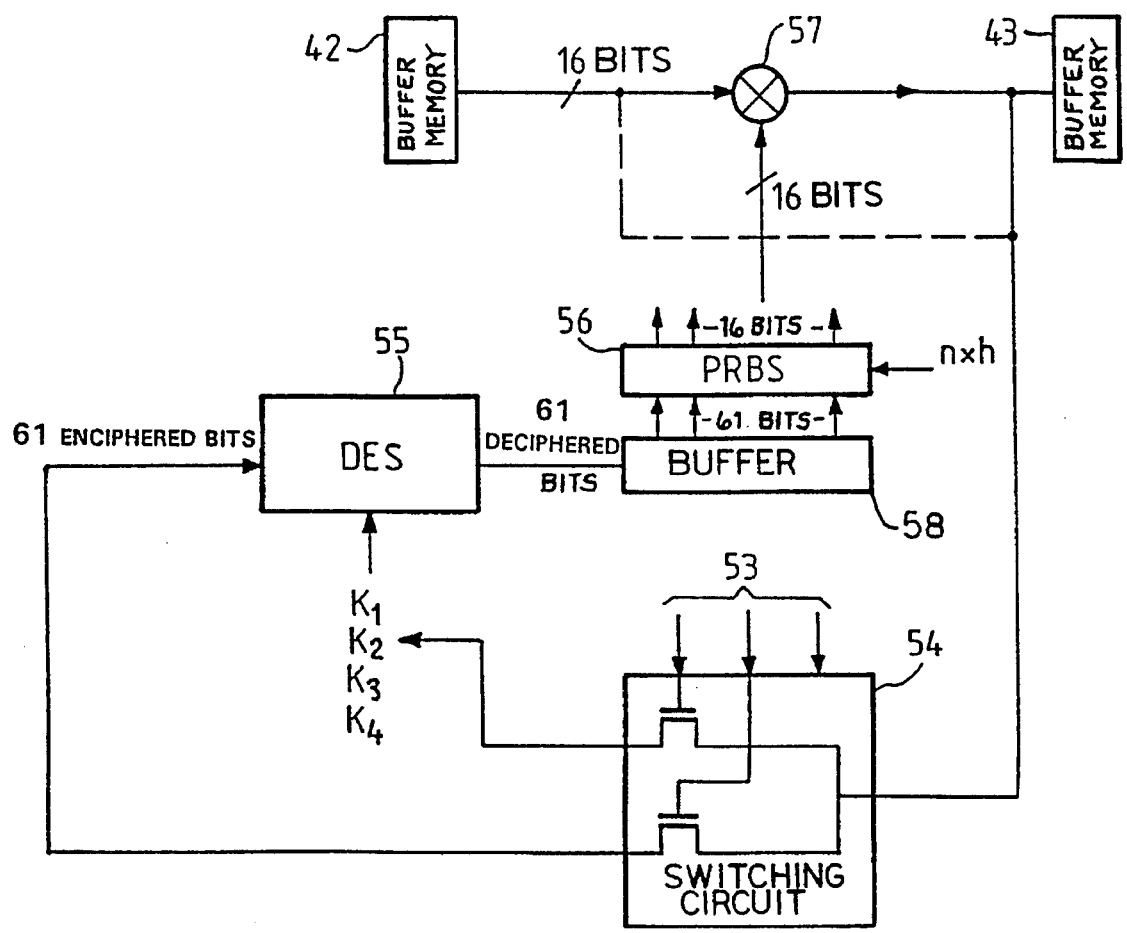

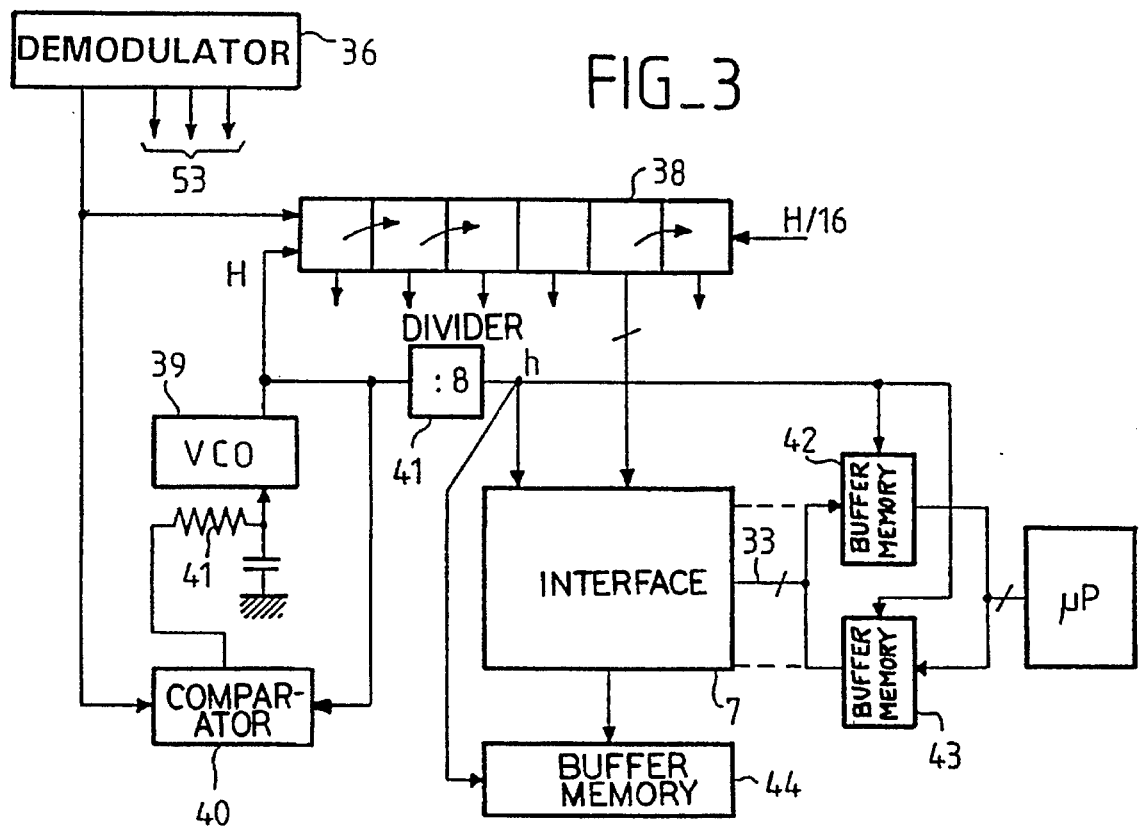
FIG_3
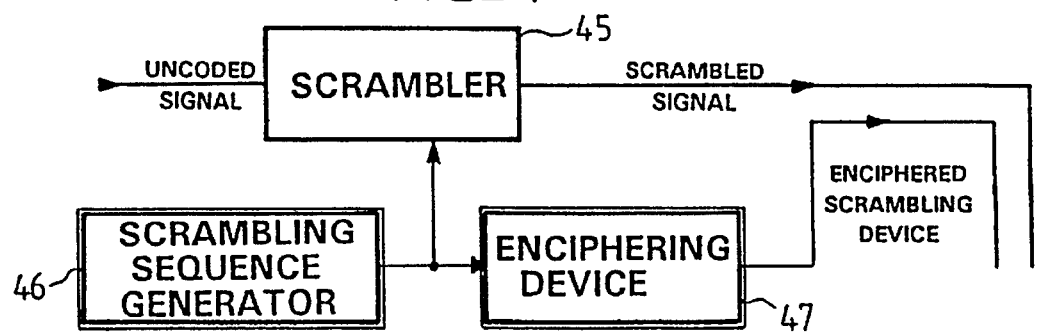
FIG_4
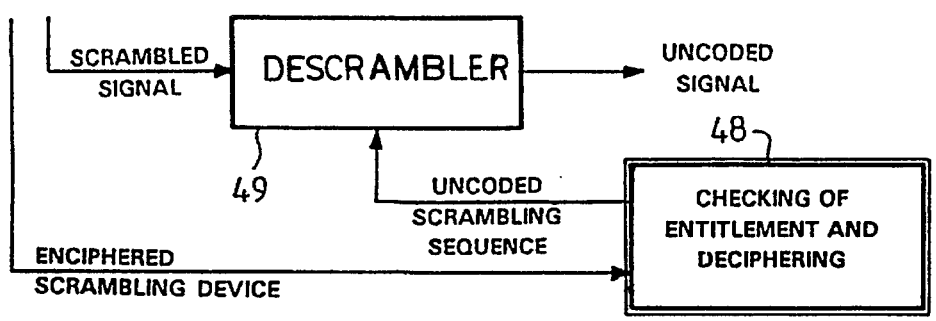

METHOD AND DEVICE FOR THE UTILIZATION OF ELECTRICAL SIGNALS

BACKGROUND OF THE INVENTION

1. Field of the Invention

An object of the present invention is a device for the exploitation or utilization of electrical signals, especially signals delivered at a high bit rate. The invention is more particularly applicable in the audio-visual field or in the field of data processing. It is aimed at enabling the interposition, in a transmission channel going from a receiver to a signal-utilization device, of an auxilary circuit that plays a role in the processing of the received signals or that replaces these signals.

2. Description of the Prior Art

In the audio-visual field, currently used television sets have few interfaces with the outside world. Most of these television sets have only one high-frequency input (antenna input) that is connected to the television set and gives a signal to be displayed. In Europe, and more especially in France, a connector known as a PERITEL type connector has 21 pins. It gives the fullest possible range of input/output signals available to date, with analog video and audio inputs and outputs in separate basebands (SECAM or PAL or even NTSC encoded video signals). It furthermore provides the possibility of entering a main or superimposable analog RGB signal. Certain manufacturers propose a series data bus called "D2 B" used to transmit man/machine interface commands and data elements. Certain "monitor"-type television sets outside France have video or audio inputs/outputs equivalent to the baseband signals of the PERITEL connector, but these inputs are on an RCA plug.

Known audio-visual systems with access control, for example those used in subscriber television systems, are divided into two functional parts. A first part relates to a system for the scrambling/unscrambling (or descrambling) of the electrical signals conveying the image and/or the sound and/or the associated data elements (for example teletext data elements). (Hereinafter, the terms "unscrambling" and "descrambling" will be used interchangeably, as will the terms "unscamble" and "descramble" and the terms "unscrambler" and "descrambler." This first part converts the signals so as to make them unintelligible to an unauthorized entity. For example, there are known video line shifting systems, video line cut-off and rotation (or rather translation) systems (known as LCAR systems) or even audio spectrum reversal systems. The scrambling is done by the signal transmission source. The unscrambling (which is a function symmetrical to the scrambling function) is carried out at the reception of the signals.

The scrambling at transmission and the unscrambling at reception are kept in synchronism by a determined temporal sequence. For example, this sequence takes the form of a physical signal that is conveyed simultaneously with the scrambled signal. A physical signal such as this represents the scrambling signal used at transmission (for example, it is used to describe the location of the cut-off points for each video line in a line rotation and cut-off system). This same signal is used at reception to control the unscrambling in synchronism with the scrambler. In most of the known methods of implementation, the synchronism sequence is constituted by a sequence of control words sent at regular intervals, for example every second. The frequency, however, may be higher in order to allow for the habits of users who change channels frequently.

A second part of the system relates to an access control function which ensures that the synchronism signal described further above is available only at a receiver that has fulfilled certain conditions such as the prior payment of a fee. The access control system often consists of an enciphering system located at the transmission point which makes the synchronism sequence unintelligible before it is sent through the transmission channel. At reception, the access control system ascertains that the conditions of access (for example the payment of a charged fee) are met. If these conditions have been met, then the system authorizes the deciphering (the operation that is symmetrical with the enciphering) of the synchronism sequence, and gives the sequence in uncoded form to the unscrambling system.

In a known mode of implementation, the function of access control at reception is carried out by a microcircuit card while the function of unscrambling at reception is carried out by an electronic circuit that is closely associated with the other functions of reception of the signals. For example, the standard functions for a subscriber television decoder are distributed in a reception circuit connected to an unscrambling circuit. The unscrambling keys are given by a microcircuit card (chip card or chip carrier). In a mode of implementation such as this, the unscrambling function is located inside a main pack called a decoder. The microcircuit card, which can be plugged into the main pack, fulfills the access control function. As a general rule, the unscrambling function may be public and not contain any secrets. The secrets that protect the system reside in the microcircuit card which carries out the function of deciphering the synchronism sequence in real time and on demand.

At present, in most countries, the connection of access-control systems to television sets is done by series connection to the antenna input of the television set. In Europe, the connection may be made by means of the PERITEL connection through the use of signals encoded in baseband (PAL/SECAM/NTSC or even RGB for decoders working on HDMAC or D2MAC signals). To date, television sets do not have interfaces dedicated to the function of unscrambling and access control.

There also exist peripherals for television sets that are capable of producing images and sound locally (apart from video tape-recorders and videodisk equipment). These are notably games panels and ANTIOPE type sub-titling devices. These devices produce an image digitally by the creation of an image memory (bit-map) stored in a specialized memory internal to the device. This image is converted into video signals by conversion into RGB signals or by conversion into signals encoded in baseband (PAL/SECAM/NTSC). If necessary, this signal may even be modulated in microwave mode for television sets having only one antenna input.

The "ANTIOPE" type devices, used in France, can superimpose their images (for example sub-titles for persons with hearing difficulties) by using the superimposing function available on the PERITEL connector through the analog RGB signals). In other countries, the switching between the signal produced by a device such as this (for example a games terminal) and the antenna signal can be done only by means of a hand-operated mechanical switch, enabling the connection of the microwave modulated signal.

The known interfaces of television sets for interfacing with digital audio-visual signals are unsuited at the present time. Indeed, none of the signal interfaces available in present-day television sets is capable of managing audio-visual signals in digitized form. The interfacing needs of digital audio-visual signals are limited today by the small number of devices capable of producing or processing such digital signals. In the near future, with the advent of so-called all-digital television transmission systems, and the appearance of digital video tape-recorders, this requirement will become vitally important for the avoidance of deterioration, through unnecessary digital/analog conversions, in the quality of the signals processed by devices designed for large-scale consumption. A digital interface is therefore indispensable, in the same way as the so-called Y/C connector became necessary and had to be created when the S-VHS system appeared.

With regard to current subscriber television systems as described here above, the signals exchanged at the interface between the part containing the unscrambler and the access control system comprise:

the enciphered sequence for the synchronization of the scrambling, sent regularly to the access control system;

the same synchronization sequence, in uncoded form, after deciphering, sent by the access control to the unscrambler.

It can be seen then that the synchronization sequence of the unscrambler, in uncoded form, is available at the interface. It could be re-routed in order to be given, for example, to other decoders that do not have a valid access control system available.

In systems where the signals are transmitted in analog mode between the transmitter and the receiver, it is sometimes easier for a would-be pirate to tackle the transmitted signal in order to try and understand its modifications by scrambling. For example, he or she may achieve this goal by physical methods of self-correlation. This is preferable to an attempt to reproduce the synchronization sequence which is often constituted by large numbers of binary digital elements (for example 61 bits and more) that are updated frequently (every second).

However, in current systems, and above all in future systems, where the transmission of the signal will be done digitally (for example in high-definition television or in DAB or digital audio broadcasting), a pirate will no longer be able to tackle the transmitted signal by physical methods such as that of self-correlation. Indeed, these signals will conform to the MPEG standards for moving images. In this case, the constitution of the images is done by integration of the successive images with one another for the definition of a definitive image. In practice, there are no longer any video signals as such that are transmitted.

Consequently, would-be pirates would prefer to set their sights on the synchronism sequence of the unscrambler (or even on the unscrambler itself if it is not public). Indeed, this sequence has a lower frequency than the signal itself, and is therefore easier to distribute if necessary. The extent of the risk incurred with such an architecture can be imagined, especially if the unscrambling function is directly integrated with a device such as a television set. If the synchronism sequence is re-routed to the interface between the television set and the microcircuit card, or if the pirate works on the unscrambler itself, then every such television set that has been installed will come under threat.

The invention proposes a solution to the abovementioned interface problem for systems, notably audio-visual systems with digital transmission. The invention consists, for example, of the definition, in this transmission, of a full-duplex, two-way interface with parallel bus, capable of conveying audio-visual digital signals between a television set and the outside world. This interface is the digital equivalent of the PERITEL connector. The problem to be resolved by such an interface is that of seeing to it that the information bit rates, which are necessarily very high when the system is in digital mode, can be conveyed properly between the receiver and an external (auxiliary) circuit and then between the external (auxiliary) circuit and the television set in real time. (Hereinafter, the terms "external" and "auxiliary" will be used interchangeably.). The interface resolves two problems simultaneously:

it enables the direct connection, without digital/analog conversion, of synthesis video generators such as sub-titling machines, games terminals and personal computers.

it enables the function of unscrambling digital television signals to be transferred to a detachable element.

In this detachable element, the unscrambling function is directly associated with the access control function. According to the invention, the audio-visual device comprising such an interface no longer holds any secrets and therefore will not be preyed upon in any way if it is designed to reproduce or record a scrambled signal. Should the unscrambled signal ever be compromised, it could be replaced by the changing of the detachable module connected to the interface without the audio-visual device itself being brought into question. Naturally, this audio-visual device may be a computer or other system, using digital data elements.

The invention shall therefore be described with reference to an audio-visual application such as this, without however restricting its scope thereto.

SUMMARY OF THE INVENTION

An object of the invention, therefore, is a device for the utilization of electrical signals, notably image, sound, data or command signals comprising:

a receiver to receive these signals;

an utilization device, notably a display device, to utilize the received signals;

a communications interface with a high bit rate, located functionally between the receiver and the utilization device and capable of transmitting the signals from the receiver to the exploitation device and of transmitting these signals to an auxiliary circuit and/or of transmitting similar signals from this auxiliary circuit to the utilization device, wherein said device comprises a generator of alternating clock signals synchronous with the high bit rate, and wherein the interface comprises an orientation circuit to transmit signals from the receiver to the auxiliary circuit for a given half-cycle of this clock signal and to transmit signals from the auxiliary circuit to the utilization device for another given half-cycle of this clock signal.

BRIEF DESCRIPTION OF THE DRAWINGS

The invention will be understood more clearly from the following description and from the accompanying figures which are given purely by way of an indication and in no way restrict the scope of the invention. Of these figures:

FIG. 1 shows a schematic view of an exploitation device according to the invention;

FIG. 2 shows a timing diagram of signals exchanged in the interface of the invention.

FIG. 3 shows a particular exemplary embodiment of the interface of the invention;

FIGS. 4 and 5 show a particular mode of processing of the signals in an auxiliary circuit.

MORE DETAILED DESCRIPTION

FIG. 1 shows a device according to the invention. This device has a receiver 1 to receive signals, notably image, sound, data or command signals transmitted, for example, by means of an open-wire system 2 or a coaxial cable or another system of transmission. To clarify the picture, the baseband of the transmitted signal is of the order of 6 MHz. Given the compression devices known at the present time, it is possible to transmit up to 32 megabits per second in a baseband such as this, notably by using QAM or QPSK type modulation functions.

The apparatus also includes a device 3 for the utilization of the received signals. (Hereinafter, the terms "utilization" and "exploitation" will be used interchangeably, as will the terms "utilize" and "exploit."). In a preferred exemplary embodiment, the exploitation device 3 is an audio-visual system comprising notably an image decoder 4 and a display device 5, preferably of the television type. The signals transmitted may be video type signals and they may be signals encoded according to the MPEG standard. In this case, the decoder has, in a known way, an image memory or, rather, a frame memory 6 so that it can be connected to a television type display device 5.

The device of the invention also has an interface 7 interposed functionally between the receiver 1 and the exploitation device 3. The interface 7 is capable of conveying signals received by the receiver 1 either towards the exploitation device 3 or towards an external (auxilary) circuit 8 or, again, from the external circuit 8 towards the exploitation device 3. (As stated above, the terms "external" and "auxiliary" are used interchangeably throughout the specification.). These transfers are done at a high bit rate since it is necessary to convey, for example, 32 megabits per second. The principle of such a system is known, for example, when the external circuit 8 represents a video tape recorder and when the interface 7 represents the circuits enabling the recording of an audio-visual sequence in a magnetic tape inserted into the video tape-recorder and subsequently its retrieval on the television set 5.

The particular feature of the invention is that it has a generator to produce an alternating clock signal h that is synchronous with the high bit rate. Furthermore, the interface also has an demultiplexer circuit 9 that switches over at the rate of this clock signal. In a schematic example shown in FIG. 1, data signals available on each of the lines of a data bus 34 (represented by a single line crossed by a bar) each arrive at an demultiplexer circuit 9 according to the invention. Each line of the bus coming from the receiver 1 thus reaches a first terminal, which is a drain or source, of a transistor which is, for example, an N10 type transistor. The control gate 11 of this transistor 10 receives the clock signal h. In doing so, when the clock signal h is positive, the signal present at output of the receiver 1 is transmitted to the output 12 (source or drain) of the transistor 10. The output 12 is connected to the external circuit by a connector comprising a set of male pins 13 and female pins 14 respectively connected to the interface 7 and to the external circuit 8.

During a following half-cycle of the signal h, the transistor 10 is off and the receiver 1 is no longer connected to the external circuit 8. In this case, an output 15 of this external circuit 8 is connected to a first terminal of a transistor 16 which itself is also an N type transistor for example, the control gate 17 of this transistor 16 receiving the complementary signal of the signal h. The complementary signal of the signal h is, for example, produced from the signal h going through an inverter 18. Under these conditions, the transistor 16 is on and the signal available at output 15 of the circuit 8 is transmitted to the output 19 of the transistor 16. This output 19 is connected to one of the lines of a bus 20 of data elements connected to the exploitation device 3. Consequently, at each first type of half-cycle of the clock signal, the signals are transmitted from the receiver 1 to the external circuit 8. At the following half-cycles, they are transmitted from the circuit 8 to the receiver 3.

In one improvement, there is provision for the possibility of removing the external circuit 8. To do this, the principle of the circuit 9 is amplified by the addition of three transistors, 21, 22 and 23 respectively, whose operation shall be studied herein. This representation should be understood, however, as being given purely by way of an explanation. As shall be seen hereinafter, other embodiments may be envisaged. The transistor 21 is cascade-connected with the transistor 10 between the output 15 of the external circuit 8. The transistor 22 is connected in the same way between the output 15 of the external circuit 8 and the transistor 16. The transistor 23 is connected between the first terminal of the transistor 10 and the output 19 of the transistor 16. The transistors 21 to 23 each receive a signal indicating the presence or absence of the external circuit 8.

In a simple example, a signal indicating the presence of the external circuit 8 is produced as follows. Inside the interface 7, there are a pin 24 distributing a positive voltage, a pin 25 distributing a ground potential and a pin 26 receiving the signal indicating an absence or a presence of the circuit 8. In the circuit 8, a connection 27 is set up between a female pin 28 facing the male pin 24 and a female pin 29 facing the male pin 26. As soon as the circuit 8 is plugged into the interface, the potential available at the pin 26 is carried to a positive potential, of five volts for example, that is available at the pin 24. To prevent this potential at the pin 4 from being floating in the absence of the circuit 8, the pin 26 is furthermore connected to the ground by a high-value resistor 30. Consequently, when the circuit 8 is engaged, a potential of five volts is available at the pin 26. When this circuit 8 is removed, there is a zero potential available. This signal is used for example as such to control the N type transistors 21 and 22 or the P type transistor 23. In practice, when the circuit 8 is engaged and when the signal available at the pin 26 is equal to five volts, the transistors 21 and 22 are on while the transistor 23 is off. Under these conditions, the interface works as described here above. On the contrary, when there is no circuit 8, the transistors 21 and 22 are off and the transistor 23 comes on: the interface is then a simple short-circuit between each of the wires of the bus 34 coming out of the receiver 1 and reaching the exploitation device 3. It may be the case that the transistors 21 and 22 are not necessary if the output buses of the interface, leading towards the external circuit 8, and the input buses in the interface 7, coming from the external 8, are differentiated. However, if a single bus fulfills both roles (input and output), the presence of the transistors 21 and 22 is warranted.

FIG. 2 shows timing diagrams of signals going into the interface 7. This figure shows chiefly the substantially square-shaped clock signal having rising edges 31 and descending edges 32. Rather than controlling the transistors 10, 16 and 21 to 23 with the states of the signal h, it is possible, by interposing RS or JK or other types of flip-flops in the path of this signal, to use the transitions of this signal. The transitions 31 and 32 are useful to enable (transition 32) the reading, with the bus 33 of the external circuit 8, of the signal available on the bus 34 of the receiver 1. This reading is prompted while the state transitions at output of the buffer memories of the bus have been stabilized.

The second diagram of FIG. 2 shows the states at output of the bus 34. The reading at the bus 33 may be prompted at the time of the descending edges 32 of the signal h when the external circuit 8 has to receive the signals delivered by the bus 34. Then these read signals are processed by the circuit 8 and placed again on the bus 33 at intermediate instants 35 between the edges 31 and 32 so that they can be available on the bus 20 at instants 31 that are consecutive to these instants 35. What these processing operations consist of shall be seen here below. Indeed, in a preferred embodiment of the invention, certain processing operations are carried out by the external circuit 8 which is easily detachable and interchangeable.

FIG. 3 shows, inter alia, a particular example of the production of the signal h. The receiver 1 has a demodulator 36 connected to a separating demultiplexer 37. FIG. 3 indicates the principle of operation of the demultiplexer 37. The demodulator 36 produces a pulse train, for example at 32 megabits per second. This pulse train is injected into the input of a shift register 38 of the demultiplexer 37. This shift register is furthermore controlled by a signal H produced by a voltage-controlled (VCO) type of oscillator 39. The frequency of the oscillator 39 approaches 32 MHz for example.

To synchronize the oscillator 39, a PLL type circuit with phase-loop control is used. In a circuit such as this, a comparator 40 which is, in practice, an Exclusive-OR gate, compares the pulse output of the oscillator 39 with the pulse train produced by the demodulator 36. The output of the Exclusive-OR gate is filtered in a low-pass filter 41 whose time constant is greater, for example, than 10 times the period of the signal delivered by the demodulator 36.

The oscillator 39 therefore delivers a signal H which is used to prompt the shifting of the bits stored in the shift register 38. Using a divider by eight referenced 41, it is possible, from the signal H, to produce a signal h that can be used in the interface 7. This divider by eight may quite simply consist in the output of the fourth bit of a counter counting in natural binary counting mode (24=16: 8 periods at zero followed by 8 periods at one). In this case, the register 38 is emptied every 16 periods into the bus 34. The reading of the bus 34 may last eight periods at most. In the other direction, the bus 20 is fed by the bus 15 for a maximum of eight periods also. In practice, these reading operations last for shorter periods. Of course, the bus 34 may have 32 lines instead of 16 lines. In this case, the divider 41 becomes a divider by 16. The aim may be to distribute the 64 pins of a PCMIA type interface with the utmost efficiency in order to create, in addition, a standardized link with the external circuit 8.

The circuit 9 of FIG. 1 may furthermore be replaced by input buffer memory circuits 42 or output buffer memory circuits 43 of the external circuit 8, as well as a buffer memory circuit 44 of the exploitation device 3 or even a buffer memory not shown at output of the register 38. These buffer memory circuits receive the signal h or its complementary signal if need be.

FIG. 3 shows, in particular, that the external circuit 8 is thus capable of having an input bus that ends at the buffer 42 and an output bus that emerges from the buffer 43. If such be the case, and if the interface 7 has differentiated buses in correspondence, then the transistors 21 and 22 no longer have any reason for existing, and there is no longer any risk of short-circuits. On the contrary, if it is chosen to have only bus 33, their presence is necessary.

FIG. 4 shows the processing operation to be applied to signals delivered at high bit rates when these signals correspond to a scrambled radio-television broadcast that can be unscrambled only by subscribers who have made regular payment of subscription dues. In practice, the transmitting television channel produces an uncoded signal corresponding to the transmission to be broadcast. This uncoded signal may be a standard video type signal or, on the contrary, it may be a signal encoded according to the MPEG standard referred to here above. This signal is then scrambled in a scrambler 45 by means of a scrambling sequence produced by a scrambling sequence generator 46. The scrambled signal is sent to the users. The scrambling sequence is itself enciphered in an enciphering device 47. The enciphered scrambling sequence is sent to the user at the same time as the scrambled signal. The sending is done according to known types of transmission standards such as the HDMAC, D2MAC, DSS or other standards.

At reception, the demodulators 36, or even the demultiplexers 37 which are of a known type, are capable of carrying out an extraction, from all the signals received, of the signals corresponding to the scrambled signal (to be unscrambled) and the signals corresponding to the enciphered scrambling sequences. (As stated above, the terms "unscramble" and "descramble" are used interchangeably throughout the specification, as are the terms "unscrambling" and "descrambling" and the terms "unscrambler" and "descrambler.") In the invention, the external circuit 8 is capable of receiving the enciphered scrambling sequence and of deciphering it to produce an uncoded scrambling sequence. This operation is carried out during a step 48 for the verification of the user's entitlement to use the system and for the deciphering of the enciphered scrambling sequence. The principle of this step 48 in no way differs from what is known in the prior art. Furthermore, the circuit 8 is capable, during an unscrambling step 49, of unscrambling the received scrambled signal on the basis of the uncoded scrambling sequence reconstructed at the end of the step 48. At the end of the step 49, the circuit 8 produces the uncoded signal that should ultimately be transmitted on the bus 20 to the exploitation circuit 3. The principle of the step 49 too is not different from what is known in the prior art.

However, the characteristic feature of the invention lies in the fact that the unscrambling 49 is now done in the external circuit 8 and no longer, as was done previously, in the exploitation device 3 itself. In practice, the difference lies in the fact that the uncoded scrambling sequence is no longer available at the interface between an external deciphering circuit and the exploitation circuit which would contain the means of carrying out the unscrambling 49.

To carry out these operations 48 and 49, the circuit 8 has a microprocessor 50 in relation with a program memory 51 and a working memory 52. These operations then offer all the known guarantees of security of inviolability, notably in the field of chip cards. The particular feature of the invention therefore lies in the fact that the uncoded signal available at the output bus 33 of the external circuit 8 is a signal with a high bit rate (typically several tens of megabits per second) that is very difficult to distribute in a practical way, even over short distances as in a block of dwellings.

Typically setting a data bit rate with a new 16-bit word every 250 nanoseconds at output of the interface 7 (interleaved with a corresponding signal every 250 nanoseconds in the other direction) makes it possible to convey a total of 32 megabits per second in each direction. A 250-nanosecond duration such as this is quite enough to carry out a reading operation and to have time left for a processing operation.

Control words 53 are available at output of the receiver 1: these words may be conveyed by simple electrical connection in the interface 7 to the external circuit 8 or to the exploitation circuit 3. The production of these control words is of a type known in standards such as EUROCRYPT and may occur at the demodulator 36 as well as the demultiplexer 37. These control words are specified in the standards and generally arrive at the head of a pulse train representing data elements, addresses or various types of information. These Control words are applied in the external circuit 8 to a switch circuit 54 (FIG. 5).

In one example, one of these control words may be used to designate a key $K_i$ from among a set of keys $K_1$ to $K_N$ that are non-diversified (i.e. common to a large number of external circuits 8), but unknown and secret because they are stored in zones of the external circuit 8 that are inviolable (according to modes known in the field of chip cards). The choice of a key from among a set of keys then makes it possible to set the parameters of a DES type deciphering algorithm in such a way that, during an operation 55, the microprocessor 50 prompts the deciphering of the enciphered scrambling sequence. In practice, this enciphered sequence has 61 bits. At the end of the operation 55, the microprocessor delivers a sequence of 61 deciphered bits. These 61 bits are given to a Pseudo-Random Binary Sequence (PRBS) generator 56 which, from these bits, produces an unscrambling word of 8, 16 or 32 bits according to need. Each of the parallel outputs of the generator 56 is combined with a corresponding line of the bus 33 in an unscrambling circuit 57. The circuit 75 implements the operation 49. In a simple example, the circuit 57 is quite simply constituted by a set of Exclusive-OR type gates. In this case, the operation 45 is also an Exclusive-OR function. It is known, indeed, that an Exclusive-OR gate has the particular feature of being symmetrical. It is used for scrambling with a scrambling word as well as for unscrambling with the same unscrambling word. In this case, the microprocessor 50 only sets the rate of the operation of the circuit 57. The inputs and outputs of the circuit 57 are connected respectively to the buffers 42 and 43.

FIG. 5 shows that the input of the circuit 54 is connected to the output of the circuit 57. In practice, this is significant only if the enciphered scrambling sequence itself has been scrambled by the scrambler 45 before being sent. If this is not so, i.e. if the enciphered scrambling sequence is sent as such, then the input of the circuit 54 is connected directly to the bus 33 (the link is indicated by dashes).

When the external circuit connected to the interface 7 is not a deciphering and unscrambling system but constitutes a cartridge of a games terminal, the operation is slightly different. In this case, indeed, a control bus 58 (FIG. 1) of the microprocessor 50 produces a logic level which sets the signal h in a state such that the interface no longer works alternately in input/output mode but solely and permanently in one direction only. One of the lines of the control bus is connected, for example, electrically to a connection conveying the signal h.

As a complement, a remote control 59 may prompt the setting of the control words 53 in a particular state that causes the performance of a particular action in the external circuit 8 or even in the exploitation device 3. An example of this would be the storage of a particular audio-visual sequence. One or two images may thus be stored in the memory 52 or in another annex memory. In this case, the random-access memory 52 is preferably a saved RAM.

What is claimed is:

1. A device comprising
    a receiver, the receiver receiving a digital electrical signal;
    a utilization device;
    an auxiliary circuit;
    a clock signal generator, the generator generating a clock signal, and the clock signal having first and second half-cycles; and
    a communications interface, the communications interface being coupled to the receiver, to the utilization device, and to the auxiliary circuit, and the communications interface including a demultiplexer, the demultiplexer further comprising:
        a first switch circuit establishing a first transmission channel between the receiver and the auxiliary circuit for the first half-cycle of the clock signal, the first switch circuit relaying the digital electrical signal from the receiver to the auxiliary circuit in real time and during the first half-cycle of the clock signal;
        a second switch circuit establishing a second transmission channel between the auxiliary circuit and the utilization device for the second half-cycle of the clock signal, the second switch circuit relaying a processed signal corresponding to the digital electrical signal from the auxiliary circuit to the utilization device in real time and during the second half-cycle of the clock signal; and
        a third switch circuit establishing a direct transmission channel between the receiver and the utilization device for the first and second half-cycles of the clock signal, the direct transmission channel being inactive when the first and second transmission channels are active.

2. A device according to claim 1 wherein the communications interface further comprises a detection circuit to detect the presence of the auxiliary circuit and to deactivate the third switch circuit in response to the presence of the auxiliary circuit.

3. A device comprising:
    a receiver, the receiver receiving a digital electrical signal;
    a utilization device;
    an auxiliary circuit
    a clock signal generator, the generator generating a clock signal, and the clock signal having first and second half-cycles; and
    a communications interface, the communications interface being coupled to the receiver, to the utilization device, and to the auxiliary circuit, and the communications interface including
        a demultiplexer, the demultiplexer relaying the digital electrical signal from the receiver to the auxiliary circuit in real time and during the first half-cycle of the clock signal, and the demultiplexer relaying a processed signal corresponding to the digital electrical signal from the auxiliary circuit to the utilization device in real time and during the second half-cycle of the clock signal,
        a data bus of at least sixteen two-way lines,
        a control bus for producing a logic level dependent on the signal transmitted from the auxiliary device, and
        two electrical supply lines for supplying a voltage to the auxiliary circuit.

4. A device comprising:
    a clock signal generator, the generator generating a clock signal, and the clock signal having first and second half-cycles;

a receiver, the receiver receiving a digital electrical signal, the receiver further comprising;
    a data exchange bus, the data exchange bus having N wires which couple the receiver to the communications interface,
    a means for dividing the frequency of the clock signal by one-half N
    a synchronization circuit for synchronizing the clock signal to the digital electrical signal;

a utilization device;

an auxiliary circuit;

a communications interface, the communications interface being coupled to the receiver, to the utilization device, and to the auxiliary circuit, and the communications interface including a demultiplexer,
    the demultiplexer relaying the digital electrical signal from the receiver to the auxiliary circuit in real time and during the first half-cycle of the clock signal, and
    the demultiplexer relaying a processed signal corresponding to the digital electrical signal from the auxiliary circuit to the utilization device in real time and during the second half-cycle of the clock signal.

5. A device comprising:

a receiver, the receiver receiving a digital electrical signal;

a utilization device;

an auxiliary circuit, the auxiliary circuit deciphering a scrambling sequence and descrambling the received signals using the deciphered scrambling sequence;

a clock signal generator, the generator generating a clock signal, and the clock signal having first and second half-cycles; and a communications interface, the communications interface being coupled to the receiver, to the utilization device, and to the auxiliary circuit, and the communications interface including a demultiplexer,
    the demultiplexer relaying the digital electrical signal from the receiver to the auxiliary circuit in real time and during the first half-cycle of the clock signal, and
    the demultiplexer relaying a processed signal corresponding to the digital electrical signal from the auxiliary circuit to the utilization device in real time and during the second half-cycle of the clock signal.

6. A device comprising:

a receiver, the receiver receiving a digital electrical signal;

a utilization device;

an auxiliary circuit, the auxiliary circuit including a microprocessor for checking the entitlement of a user of the utilization device;

a clock signal generator, the generator generating a clock signal, and the clock signal having first and second half-cycles; and a communications interface, the communications interface being coupled to the receiver, to the utilization device, and to the auxiliary circuit, and the communications interface including a demultiplexer,
    the demultiplexer relaying the digital electrical signal from the receiver to the auxiliary circuit in real time and during the first half-cycle of the clock signal, and
    the demultiplexer relaying a processed signal corresponding to the digital electrical signal from the auxiliary circuit to the utilization device in real time and during the second half-cycle of the clock signal.

7. A device comprising;

a receiver the receiver receiving a digital electrical signal, the digital electrical signal being scrambled;

a utilization device;

an auxiliary circuit, the auxiliary circuit comprising an Exclusive-OR circuit to descramble the scrambled digital electrical signal;

a clock signal generator, the generator generating a clock signal, and the clock signal having first and second half-cycles; and a communications interface, the communications interface being coupled to the receiver, to the utilization device, and to the auxiliary circuit, and the communications interface including a demultiplexer,
    the demultiplexer relaying the digital electrical signal from the receiver to the auxiliary circuit in real time and during the first half-cycle of the clock signal, and
    the demultiplexer relaying a processed signal corresponding to the digital electrical signal from the auxiliary circuit to the utilization device in real time and during the second half-cycle of the clock signal.

8. A method of utilizing a digital electrical signal, said method comprising the steps of;

generating a clock signal, the clock signal having first and second half-cycles;

providing a data exchange bus, the data exchange bus having N wires which couple the receiver to the communications interface;

dividing the frequency of the clock signal by one-half N;

receiving the digital electrical signal in a receiver;

transmitting the digital electrical signal from the receiver to an auxiliary circuit during the first half-cycle of the clock signal;

processing the digital electrical signal in the auxiliary circuit to form a processed digital signal;

transmitting the processed digital electrical signal from the auxiliary circuit to a utilization device during the second half-cycle of the clock signal; and utilizing the processed digital electrical signal with the utilization device.

\* \* \* \* \*